(12) United States Patent
Jeon et al.

(10) Patent No.: US 8,673,506 B2
(45) Date of Patent: Mar. 18, 2014

(54) NON-AQUEOUS ELECTROLYTE AND LITHIUM SECONDARY BATTERY HAVING THE SAME

(75) Inventors: Jong-Ho Jeon, Daejeon (KR); Jeong-Ju Cho, Daejeon (KR); Ho-Chun Lee, Daejeon (KR)

(73) Assignee: LG Chem, Ltd. (KR)

( * ) Notice: Subject to any disclaimer, the term of this patent is extended or adjusted under 35 U.S.C. 154(b) by 327 days.

(21) Appl. No.: 12/663,597

(22) PCT Filed: Jun. 11, 2008

(86) PCT No.: PCT/KR2008/003250
§ 371 (c)(1),
(2), (4) Date: Jun. 17, 2010

(87) PCT Pub. No.: WO2008/153309
PCT Pub. Date: Dec. 18, 2008

(65) Prior Publication Data
US 2010/0273064 A1  Oct. 28, 2010

(30) Foreign Application Priority Data
Jun. 12, 2007 (KR) .................. 10-2007-0057321

(51) Int. Cl.
*H01M 4/00* (2006.01)
(52) U.S. Cl.
USPC .......................................... 429/326; 429/322
(58) Field of Classification Search
USPC .......................................... 429/322, 326, 188
See application file for complete search history.

(56) References Cited

U.S. PATENT DOCUMENTS

| | | |
|---|---|---|
| 5,256,504 A | 10/1993 | Okuno et al. |
| 5,284,722 A | 2/1994 | Sugeno |
| 5,296,319 A | 3/1994 | Bito et al. |
| 5,474,862 A | 12/1995 | Okuno et al. |
| 6,942,948 B2 | 9/2005 | Takehara et al. |
| 7,052,803 B2 | 5/2006 | Kato et al. |
| 7,083,878 B2 | 8/2006 | Kotato et al. |
| 7,144,660 B2 | 12/2006 | Shima et al. |
| 7,223,502 B2 | 5/2007 | Onuki |

(Continued)

FOREIGN PATENT DOCUMENTS

| | | |
|---|---|---|
| CN | 1560953 A | 1/2005 |
| CN | 1845372 A | 10/2006 |

(Continued)

OTHER PUBLICATIONS

International Search Report, PCT/KR2008/003250, dated Aug. 22, 2008.

(Continued)

*Primary Examiner* — Mark F Huff
*Assistant Examiner* — Monique Wills
(74) *Attorney, Agent, or Firm* — Lerner, David, Littenberg, Krumholz & Mentlik, LLP

(57) ABSTRACT

A non-aqueous electrolyte includes (i) a cyclic anhydride; (ii) an electrolyte solvent containing carbonate and linear saturated ester; and (iii) an electrolyte salt. Since the linear saturated ester and cyclic anhydride are used in mixture as components of an electrolyte, it is possible to minimize problems caused by using either of the linear saturated ester or cyclic anhydride and to improve life cycle performance of the secondary battery and charging/discharging characteristics at room temperature or a high temperature.

17 Claims, 1 Drawing Sheet

(56) References Cited

U.S. PATENT DOCUMENTS

| | | |
|---|---|---|
| 7,235,334 B2 | 6/2007 | Kim et al. |
| 7,261,979 B2 | 8/2007 | Gozdz et al. |
| 2002/0192564 A1 | 12/2002 | Ota et al. |
| 2003/0165733 A1 | 9/2003 | Takehara et al. |
| 2004/0072080 A1 | 4/2004 | Iwanaga et al. |
| 2004/0146785 A1 | 7/2004 | Mizutani et al. |
| 2004/0229128 A1 | 11/2004 | Noh |
| 2005/0000086 A1 | 1/2005 | Mizutani et al. |
| 2005/0053843 A1 | 3/2005 | Takahashi |
| 2005/0164094 A1 | 7/2005 | Kotato et al. |
| 2006/0121356 A1 | 6/2006 | Jan et al. |
| 2006/0194115 A1 | 8/2006 | De Jonghe et al. |
| 2006/0228625 A1 | 10/2006 | Kawashima |
| 2007/0009806 A1* | 1/2007 | Kim .................. 429/329 |
| 2007/0059606 A1 | 3/2007 | Lee et al. |
| 2007/0166617 A1 | 7/2007 | Gozdz et al. |
| 2009/0170006 A1 | 7/2009 | Abe et al. |
| 2010/0015514 A1 | 1/2010 | Miyagi et al. |
| 2010/0119956 A1* | 5/2010 | Tokuda et al. ............. 429/338 |

FOREIGN PATENT DOCUMENTS

| | | |
|---|---|---|
| EP | 1009057 A1 | 6/2000 |
| EP | 1195833 A1 | 4/2002 |
| EP | 1276165 A1 | 1/2003 |
| EP | 1939971 A1 | 7/2008 |
| EP | 1030399 B1 | 5/2009 |
| JP | 3032338 A | 2/1991 |
| JP | 4-284374 A | 10/1992 |
| JP | 5-182689 A | 7/1993 |
| JP | 05-242910 A | 9/1993 |
| JP | 6-020721 A | 1/1994 |
| JP | 7-153486 A | 6/1995 |
| JP | 2007-254434 | 10/1995 |
| JP | 8241731 A | 9/1996 |
| JP | 08-339824 A | 12/1996 |
| JP | 2003132888 A | 5/2003 |
| JP | 2003243031 A | 8/2003 |
| JP | 2004241339 A | 8/2004 |
| JP | 2004281073 A | 10/2004 |
| JP | 2005267938 A | 9/2005 |
| JP | 2007019012 A | 1/2007 |
| JP | 2007-141831 A | 6/2007 |
| KR | 100342605 A | 6/2002 |
| KR | 10-0567113 A | 2/2004 |
| KR | 20050025101 A | 3/2005 |
| KR | 20060033920 A | 4/2006 |
| KR | 20070019965 A | 2/2007 |
| KR | 20070031806 A | 3/2007 |
| KR | 100833041 A | 5/2008 |
| WO | 03044882 A1 | 5/2003 |
| WO | 2004023589 A1 | 3/2004 |
| WO | 2007/020876 A1 | 2/2007 |
| WO | 2007055087 A1 | 5/2007 |
| WO | 2007/064076 A1 | 6/2007 |
| WO | 2008023951 A1 | 2/2008 |
| WO | 2008044850 A1 | 4/2008 |
| WO | 2008050971 A1 | 5/2008 |

OTHER PUBLICATIONS

International Search Report, PCT/KR2008/003328, dated Sep. 24, 2008.

U.S. Appl. No. 12/602,239.

Ohta et al., "Relationship between carbonaceous materials and electrolyte in secondary lithium-ion batteries", Journal of Power Sources 54 (1995) 6-10.

Extended European Search Report for Application No. EP08766212.8 dated Jul. 20, 2012.

International Search Report, PCT/KR2008/007881, dated Aug. 20, 2009.

* cited by examiner

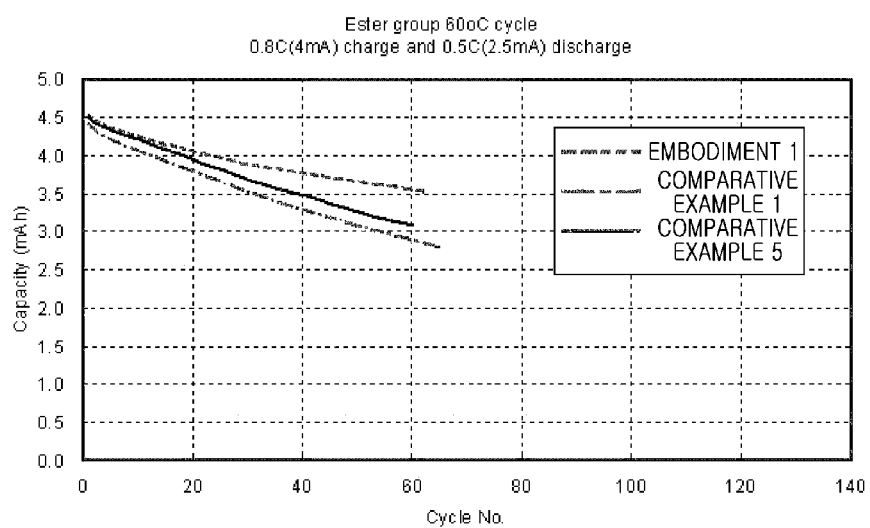

NON-AQUEOUS ELECTROLYTE AND LITHIUM SECONDARY BATTERY HAVING THE SAME

CROSS REFERENCE TO RELATED APPLICATIONS

The present application is a national phase entry under 35 U.S.C. §371 of International Application No. PCT/KR2008/003250, filed Jun. 11, 2008, published in English, which claims priority from Korean Patent Application No. 10-2007-0057321, filed Jun. 12, 2007, all of which are incorporated herein by reference.

TECHNICAL FIELD

The present invention relates to an electrolyte capable of extending a life cycle and improving charging/discharging characteristics of a secondary battery at room temperature or a high temperature.

BACKGROUND ART

Recently, interest in energy storage technologies has increased. As the energy storage technologies are extended to such devices as cellular phones, camcorders and notebook PC, and further to electric vehicles, endeavors for research and development of electrochemical devices have become more focused. Therefore, the electrochemical devices have been drawing an attention in this aspect, and among them, the interest has focused on the developments of rechargeable secondary batteries.

Among the currently used secondary batteries, a lithium secondary battery developed in the early 1990's allows repeated charging/discharging as lithium ions are intercalated into or disintercalated from cathode and anode. This lithium secondary battery may convert chemical energy into electrical energy by means of oxidation and reduction reactions. Since the lithium secondary battery generally has an average discharge voltage of about 3.6V to about 3.7V, it is in the spotlight from the viewpoint of higher operation voltage and greater energy density in comparison to conventional batteries such as Ni—MH or Ni—Cd batteries.

The lithium secondary battery may include a cathode, an anode, a porous separator and an electrolyte. The electrolyte is generally made using a carbonate-based organic solvent such as ethylene carbonate (EC) and dimethyl carbonate (DMC) as an electrolyte solvent and a lithium salt such as $LiPF_6$ and $LiBF_4$ as an electrolyte salt. In order for the battery to have such a higher operation voltage as mentioned above, an electrolyte composition should be electrochemically stable in a charging/discharging voltage range from about 0 to about 4.2V.

However, a carbonate-based organic solvent is generally decomposed on the surface of an electrode during the charging/discharging process, so it may cause side reactions in the battery. For example, an electrolyte solvent having a large molecular weight such as ethylene carbonate (EC), dimethyl carbonate (DMC) or diethyl carbonate (DEC) is cointercalated between graphite layers in a carbon-based anode. This cointercalation may destroy the anode structure. As a result, the performance of a lithium secondary battery may deteriorate gradually as charging/discharging process is repeated.

It is known in the art that the above problems may be solved using a solid electrolyte interface (SEI) film formed on the surface of an anode by a reduction reaction of a carbonate-based organic solvent during the initial charging process. However, the SEI film is generally insufficient in continuously acting in the role of a protective film for an anode. In addition, as the reduction reaction on the surface of the anode is repeated, the battery capacity may be reduced and the battery life cycle may be shortened. Further, while the SEI film is formed, the carbonate-based organic solvent may decompose, which may generate gas such as CO, $CO_2$, $CH_4$, $C_2H_6$, etc.

Furthermore, the SEI film is thermally unstable. Thus, when a battery is left at a high temperature in a fully charged state, the SEI film may be easily broken down due to increased electrochemical energy and thermal energy over time. It induces continuous side reactions between the surface of the anode and the electrolyte, and decomposition of the electrolyte, and may continuously generate gas such as $CO_2$. Accordingly, the inner pressure of the battery may be increased, thereby increasing the thickness of the battery. This may cause performance problems in electronics such as cellular phones and notebook computers with regard to high temperature performance of the battery.

In order to solve the above problems, there have been suggested a method of adding a sulfide-based compound to an electrolyte to restrain decomposition of the electrolyte and a method of adding diphenyl picrylhydrazyl (DPPH) to improve high-temperature stability. However, when the above specific compounds are added to an electrolyte to improve the battery performance, some areas of performance are improved, but other areas of performance may deteriorate. Likewise, in many conventional batteries, only certain areas of performance are improved.

Meanwhile, an electrolyte solvent of a lithium secondary battery generally employs ethylene carbonate which is a cyclic carbonate compound. However, since ethylene carbonate has a high freezing point (37 to 39° C.), a battery using the ethylene carbonate may exhibit a poor low temperature performance. To solve this problem, Japanese Laid-open Patent Publication No. H07-153486 discloses a lithium secondary battery using an electrolyte made by adding 0.5 to 50 volume % of γ-butyrolactone to a 1:1 (volume ratio) mixture of ethylene carbonate and dimethyl carbonate. However, if γ-butyrolactone is added in this manner, the life cycle of the battery may be shortened though the high-rate discharge characteristic at a low temperature is improved.

Japanese Laid-open Patent Publication No. H06-20721 discloses a secondary battery using a non-aqueous electrolyte to provide a high-capacity secondary battery, which includes an anode of carbon material containing graphite with its plane interlayer spacing (d002) being less than 0.337 and a non-aqueous electrolyte solvent containing 20 to 50 volume % of γ-butyrolactone and the remaining volume % of a cyclic carbonate. However, since the above non-aqueous solvent does not include a straight-chain carbonate, this electrolyte solvent has a high viscosity and low ionic conductivity and the battery prepared therefrom exhibits deteriorated low temperature discharge capacity.

In addition, a method has been proposed for improving the charging/discharging characteristics of a battery at room temperature and a low temperature by employing a linear ester compound having a low viscosity as an electrolyte additive/solvent (see Japanese Laid-open Patent Publication Nos. H05-182689 and H04-284374). However, the employed linear ester compound has a high reactivity with the graphite anode frequently used in secondary batteries such that it may cause side reactions in the battery or deteriorate other performances of the battery.

This problem occurs especially when the anode has a large specific surface area. The larger the specific surface area of the anode, the more the linear ester compound reacts with the anode active material. Consequently, an excessive reduction reaction of the anode is induced. This side reaction proceeds more rapidly at a high temperature, resulting in a decline in the battery performances.

Thus, there is a demand for developing a lithium battery capable of providing a sufficient charging/discharging life cycle, effective high-temperature stability and effective low temperature discharging characteristics by changing the composition of a non-aqueous mixture solvent used in an electrolyte of a conventional lithium battery.

DISCLOSURE OF INVENTION

Technical Problem

The present inventors have found that, when a linear saturated ester and a cyclic anhydride are used together in mixture as components of an electrolyte, it is possible to minimize problems induced by using either of the linear ester or the cyclic anhydride and also to improve life cycle performance of a secondary battery and its charging/discharging characteristics at room temperature or a high temperature.

The present invention is directed to providing a non-aqueous electrolyte including a linear saturated ester and a cyclic anhydride; and a secondary battery having the same.

Technical Solution

In order to accomplish the above objective, the present invention provides a non-aqueous electrolyte including (i) a cyclic anhydride; (ii) a mixed organic solvent having a carbonate and a linear saturated ester; and (iii) an electrolyte salt. The present invention is also directed to providing a secondary battery having the above non-aqueous electrolyte.

BRIEF DESCRIPTION OF THE DRAWINGS

FIG. 1 is a graph showing charging/discharging results according to Experimental Example.

BEST MODE FOR CARRYING OUT THE INVENTION

Hereinafter, preferred embodiment of the present invention will be described in detail with reference to the accompanying drawing.

Since a linear ester compound exhibits a low melting point and low ionic conductivity, it can improve performance of the battery such as the high-rate discharging characteristic of a battery at a low temperature when it is used as a component of an electrolyte. However, the linear ester compound has a higher reactivity with an anode active material (for example, graphite) than a carbonate-based solvent, and accordingly it may deteriorate the high-temperature performance or increase the surface resistance of an electrode due to the reaction with the anode active material.

This problem occurs especially when the anode has a large specific surface area size. Generally, conventional binders including organic-based binders and water-based binders are used in the fabrication of a secondary battery. The binders may vary depending on the specific surface area size of the anode. In particular, organic-based binders such as PVDF may be employed for the anode having a small specific surface area of less than about 1.5 $m^2/g$, specifically from about 0.5 $m^2/g$ to about 1.5 $m^2/g$. On the other hand, water-based binders such as SBRs may be employed for the anode having a large specific surface area of more than about 1.5 $m^2/g$, specifically, from about 1.5 $m^2/g$ to about 4.5 $m^2/g$. It is fact that the larger the specific surface area of the anode, the more the linear ester compound reacts with the anode active material. As a result, use of PVDF-based binder may lead to acceptable side reductive reactions between the anode and the linear ester compound. However, an SBR-based binder promotes excessive reductive reactions between the two. These side reactions proceed more rapidly at a high temperature, resulting in a decline of the battery performance. Therefore, the secondary battery fabricated by using the water-based binder requires an anode inhibitor such as a cyclic anhydride for preventing the side reactions.

Meanwhile, a cyclic anhydride is a compound capable of forming a SEI film on the surface of an anode when being used as a component of an electrolyte, so it may improve stability of a battery. However, the cyclic anhydride may deteriorate the battery performance since the formed SEI film increases the resistance of a battery.

Based on the idea that when a linear saturated ester and a cyclic anhydride are employed in combination as components of an electrolyte, it is possible to minimize problems caused by using either of the linear ester or the cyclic anhydride and also to improve life cycle performance of a secondary battery and charging/discharging characteristics at room temperature or a high temperature, the present invention is characterized in that a linear saturated ester and a cyclic anhydride are used in mixture as components of an electrolyte.

The mixed use of the above components may give the following effects, but they are not limited thereto.

A linear saturated ester and a cyclic anhydride may provide complementary properties when being used in mixture as components of an electrolyte. That is to say, since the cyclic anhydride has a lower reduction potential (based on a full cell) than the linear saturated ester and the carbonate, the cyclic anhydride may be reduced prior to the linear saturated ester, thereby forming a SEI film on the surface of an anode when a battery is charged. The SEI film formed on the surface of the anode is very stable so that it is not easily broken down even by repeated charging/discharging of a battery and it may restrain the reaction between an anode and an electrolyte solvent, particularly a linear saturated ester. In addition, in the present invention, among various kinds of a linear ester, the linear saturated ester having no multiple carbon bonds shows a relatively lower reactivity. Thus, the reactivity between an anode active material and an electrolyte solvent can be further decreased.

Also, since the linear saturated ester exhibits a low viscosity and a high impregnation rate with respect to an electrode or separator, the linear saturated ester in admixture with a cyclic anhydride can decrease the battery resistance, and increase the lithium ionic conductivity in a battery. However, with use of only the cyclic anhydride, battery resistance may increase while the lithium ionic conductivity may decrease.

The non-aqueous electrolyte provided by the present invention includes (i) a cyclic anhydride; (ii) an electrolyte solvent containing a carbonate and a linear saturated ester; and (iii) an electrolyte salt.

Non-limiting examples of the cyclic anhydride may include succinic anhydride, citraconic anhydride, itaconic anhydride, phthalic anhydride, maleic anhydride, etc. The content of the cyclic anhydride may be controlled according to targeted battery performance to be improved, but it is preferably about 0.1 to about 5 parts by weight, based on 100 parts by weight of the electrolyte. If the content is less than about 0.1 parts by weight, a SEI film is not sufficiently formed on the surface of the anode. Accordingly, extended life cycle of the battery is not secured. If the content exceeds about 5 parts by weight, a thick SEI film is formed on the surface of the anode, increasing the battery impedance.

The non-aqueous electrolyte of the present invention employs a mixed organic solvent comprising a linear saturated ester and a carbonate. The mixed organic solvent has a low viscosity and excellent lithium ionic conductivity, thereby enhancing high-rate characteristics of the battery. Also, the mixed organic solvent has a low freezing point, so it can prevent deterioration of battery performance caused by condensation of an electrolyte at a low temperature.

The linear saturated ester used in the present invention may be expressed by the following Chemical Formula 1:

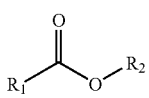

Chemical Formula 1 where $R_1$ and $R_2$ are independently a linear or branched $C_{1-5}$ alkyl group, and $R_1$ and $R_2$ may be unsubstituted or substituted with at least one halogen, respectively.

Non-limiting examples of this linear saturated ester may include methyl propionate, ethyl propionate, propyl propionate, butyl propionate, methyl butyrate, ethyl butyrate, propyl butyrate and so on, and they may be used alone or in mixture. In addition, the content of the linear saturated ester may be controlled according to a targeted battery performance to be improved, but it is preferably about 3 to about 80 parts by weight, based on 100 parts by weight of the electrolyte. If the content is less than about 3 parts by weight, the low temperature performance and high-rate characteristics of a battery are not sufficiently improved. If the content exceeds about 80 parts by weight, the battery performance may deteriorate due to increased irreversible reactions with an anode.

The above-mentioned carbonate includes a linear or cyclic carbonate, or their mixture. As non-limiting examples, the cyclic carbonate may include ethylene carbonate (EC), propylene carbonate (PC), butylene carbonate (BC), or their halogen derivatives. The linear carbonate may include diethyl carbonate (DEC), dimethyl carbonate (DMC), dipropyl carbonate (DPC), ethylmethyl carbonate (EMC), methylpropyl carbonate (MPC), or their halogen derivatives.

In addition, the content of the carbonate may be controlled according to a targeted battery performance to be improved, but it is preferably about 3 to about 80 parts by weight, based on 100 parts by weight of the electrolyte. If the content of the carbonate is less than about 3 parts by weight, the low temperature performance and high-rate characteristics are not sufficiently improved. If the content exceeds about 80 parts by weight, the battery performance may deteriorate due to increased irreversible reactions with an anode.

The non-aqueous electrolyte of the present invention includes common electrolyte salts well known in the art. At this time, a useable electrolyte salt has a chemical structure of $A^+B^-$, wherein $A^+$ includes ions composed of an alkali metal cation such as $Li^+$, $Na^+$, $K^+$ and their combinations, and $B^-$ includes ions composed of an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and their combinations, but they are not limited thereto. Also, the content of the electrolyte salt may fall within a common range known in the art, and for example the electrolyte salt may be included at a concentration of about 0.8 to about 2.0M with respect to the electrolyte solvent. If the content of the electrolyte salt is less than about 0.8 M, the life cycle and performance of the battery may deteriorate. If the content of the electrolyte salt exceeds about 2M, the viscosity of the electrolyte may increase and lowers the ionic conductivity in the battery.

In addition, the present invention provides a secondary battery, which includes a separator, a cathode, an anode and an electrolyte according to the present invention.

The secondary battery is preferably a lithium secondary battery such as a lithium metal secondary battery, a lithium ion secondary battery, a lithium polymer secondary battery or a lithium ion polymer secondary battery.

There is no particular limitation regarding the type of electrodes as long as the electrodes that may be applied to the secondary battery of the present invention. For example, the electrodes may be manufactured by mixing components of electrolyte solvent, optionally binder, conductive material and dispersing agent with an electrode active material, stirring them to give a slurry coating a metallic current collector with the slurry, and then compressing and drying it.

As a cathode active material, a common cathode active material useable for a cathode of a conventional secondary battery may be employed. As non-limiting examples, the cathode active material may include a lithium transition metal composite oxide such as $LiM_xO_y$ (M=Co, Ni, Mn, or $Co_aNi_b$-$Mn_c$) (for example, lithium manganese composite oxide such as $LiMn_2O_4$, lithium nickel oxide such as $LiNiO_2$, lithium cobalt oxide such as $LiCoO_2$, any material obtained by substituting a part of manganese, nickel or cobalt of the above oxides with another transition metal, vanadium oxide containing lithium, or the like) or chalcogen compound (for example, manganese dioxide, titanium disulfide, molybdenum disulfide, or the like). Preferably, the cathode active material includes $LiCoO_2$, $LiNiO_2$, $LiMnO_2$, $LiMn_2O_4$, $Li(Ni_aCo_bMn_c)O_2$ (herein, $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (herein, $0 \leq Y<1$), $Li(Ni_aCo_bMn_c)O_4$ (herein, $0<a<2$, $0<b<2$, $0<c<2$, $a+b+c=2$), $LiMn_{2-z}Ni_zO_4$, $LiMn_{2-z}Co_zO_4$ (herein, $0<Z<2$), $LiCoPO_4$, $LiFePO_4$, or their mixtures. Non-limiting example of a cathode current collector may be a foil made of aluminum, nickel, or their combinations.

An anode active material may use any material commonly usable for an anode of a conventional secondary battery, and the anode active material may include a lithium intercalation material such as lithium metal, lithium alloy, carbon, petroleum coke, activated carbon, graphite or other carbonaceous materials. Non-limiting example of a cathode current collector may be a foil made of copper, gold, nickel, copper alloys or their combinations.

As a binder, those commonly used in the preparation of the secondary battery may be employed. The binders may vary depending on the specific surface area size of the anode. In particular, organic-based binders such as PVDFs may be employed for the anode having a small specific surface area of less than about 1.5 m²/g, preferably from about 0.5 to about 1.5 m²/g. Also, for the anode having a large specific surface area of more than about 1.5 m²/g, preferably from about 1.5 m²/g to about 4.5 (m²/g), water-based binders may be employed. As the water-based binders, an acrylic binders and styrene-butadiene copolymer (SBR), modified styrene-butadiene copolymer, etc are exemplified. Water-based SBR is more preferable.

The separator is not specially limited, but a porous separator may be used, preferably. For example, polypropylene-based, polyethylene-based or polyolefin-based porous separators may be employed.

The secondary battery of the present invention may be manufactured according to a common method well known in the art. For example, the secondary battery may be manufactured by interposing a separator between an anode and a cathode, assembling them, and then injecting the electrolyte prepared according to the present invention therein.

No specific limitation is made for shape of the secondary battery of the present invention. However, the battery may be provided in a cylindrical can shape, an angled shape, a pouch shape or a coin shape.

MODE FOR THE INVENTION

Hereinafter, the present invention is explained in more detail using Embodiments and Comparative examples. However, the following Embodiments exist only for illustration purpose, and scope of the present invention should not be interpreted as limited thereto.

Embodiment 1

0.5 parts by weight of succinic anhydride, based on 100 parts by weight of an electrolyte, was added to a 1M $LiPF_6$ solution in which ethylene carbonate (EC) and ethyl propionate (EP) are mixed in a volume ratio of 3:7, thereby giving an electrolyte.

A battery in a coin shape was manufactured in common procedures known in the battery field except that the electrolyte prepared as above, $LiCoO_2$ for a cathode, artificial graphite for an anode, and SBR for a binder were used.

Embodiment 2

An electrolyte was prepared and a battery having the electrolyte was then manufactured in the same way as in the Embodiment 1, except that 1.0 part by weight of succinic anhydride was used instead of 0.5 parts by weight of succinic anhydride.

Embodiment 3

An electrolyte was prepared and a battery having the electrolyte was then manufactured in the same way as in the Embodiment 1, except that 5.0 parts by weight of succinic anhydride was used instead of 0.5 parts by weight of succinic anhydride.

Embodiment 4

An electrolyte was prepared and a battery having the electrolyte was then manufactured in the same way as in the Embodiment 1, except that methyl propionate (MP) was used instead of ethyl propionate (EP).

Embodiment 5

An electrolyte was prepared and a battery having the electrolyte was then manufactured in the same way as in the Embodiment 4, except that 1.0 part by weight of succinic anhydride was used instead of 0.5 parts by weight of succinic anhydride.

Embodiment 6

An electrolyte was prepared and a battery having the electrolyte was then manufactured in the same way as in the Embodiment 4, except that 5.0 parts by weight of succinic anhydride was used instead of 0.5 parts by weight of succinic anhydride.

Embodiment 7

An electrolyte was prepared and a battery having the electrolyte was then manufactured in the same way as in the Embodiment 1, except that propyl propionate (PP) was used instead of ethyl propionate (EP).

Embodiment 8

An electrolyte was prepared and a battery having the electrolyte was then manufactured in the same way as in the Embodiment 7, except that 1.0 part by weight of succinic anhydride was used instead of 0.5 parts by weight of succinic anhydride.

Embodiment 9

An electrolyte was prepared and a battery having the electrolyte was then manufactured in the same way as in the Embodiment 7, except that 5.0 parts by weight of succinic anhydride was used instead of 0.5 parts by weight of succinic anhydride.

Comparative Example 1

An electrolyte was prepared and a battery having the electrolyte was then manufactured in the same way as in the Embodiment 1, except that acetic anhydride was added instead of succinic anhydride.

Comparative Example 2

An electrolyte was prepared and a battery having the electrolyte was then manufactured in the same way as in the Embodiment 1, except that succinic anhydride was not added.

Comparative Example 3

An electrolyte was prepared and a battery having the electrolyte was then manufactured in the same way as in the Embodiment 4, except that succinic anhydride was not added.

Comparative Example 4

An electrolyte was prepared and a battery having the electrolyte was manufactured in the same way as in the Embodiment 7, except that succinic anhydride was not added.

Comparative Example 5

An electrolyte was prepared and a battery having the electrolyte was manufactured in the same way as in the Embodiment 1, except that ethylmethyl carbonate (EMC) was used instead of ethyl propionate (EP), and succinic anhydride was not added.

Comparative Example 6

An electrolyte was prepared and a battery having the electrolyte was then manufactured in the same way as in the Embodiment 1, except that ethylmethyl carbonate (EMC) was used instead of ethyl propionate (EP), and 0.1 parts by weight of succinic anhydride was added.

Comparative Example 7

An electrolyte was prepared and a battery having the electrolyte was then manufactured in the same way as in the Comparative Example 6, except that 1.0 parts by weight of succinic anhydride was added.

Comparative Example 8

An electrolyte was prepared and a battery having the electrolyte was then manufactured in the same way as in the Comparative Example 6, except that 5.0 parts by weight of succinic anhydride was added.

Experimental Example

Evaluation of High Temperature Battery Performance

The secondary batteries manufactured according to the Embodiment 1 and Comparative Examples 1 and 5 were respectively charged/discharged at 60° C. Their measured results are shown in FIG. 1. At this time, the charging process was carried out at a 0.8 C current rate (4 mA), and the discharging process was at a 0.5 C current rate (2.5 mA).

As shown in FIG. 1, the battery of the Comparative Example 1, which uses a linear saturated ester (EP) and a linear anhydride (acetic anhydride) in mixture as components of an electrolyte, rather exhibits a deteriorated high-temperature performance as compared to the battery of the Comparative Example 5, which does not use any electrolyte additive. Meanwhile, the battery of the Embodiment 1, which uses a linear saturated ester (EP) and a cyclic anhydride (succinic anhydride) in mixture as components of an electrolyte, shows an improved high-temperature performance in contrast to the battery of the Comparative Example 5.

From the above experiments, it can be understood that, in case a linear saturated ester and a cyclic anhydride are used in mixture as components of an electrolyte according to the present invention, complementary properties of these two components greatly improve general battery performance such as high temperature performance and charging/discharging characteristics.

INDUSTRIAL APPLICABILITY

The present invention employs a linear saturated ester and a cyclic anhydride in combination as components of an electrolyte. By doing so, it is possible to minimize problems caused by using either of the linear ester or the cyclic anhydride. In other words, reactivity between the linear saturated ester and the anode may decrease by forming a stable SEI film on the surface of an anode by means of a cyclic anhydride. Also, a resistance reduction problem of the battery caused by a cyclic anhydride, may be solved by improving a lithium ionic conductivity by the linear saturated ester having a low viscosity. In addition, the present invention allows an extended life cycle of a battery and improving charging/discharging characteristics at room temperature or a high temperature.

There can be made various modifications without departing from the scope and spirit of the present invention as defined in the appended claims.

The invention claimed is:

1. A secondary battery, comprising a cathode, an anode, a separator between the cathode and the anode, a binder for the anode, and a non-aqueous electrolyte, wherein the anode has a specific surface area of at least 1.5 $m^2/g$, and wherein the non-aqueous electrolyte comprises (i) a cyclic anhydride; (ii) an electrolyte solvent containing a propionate-based ester and a carbonate, wherein the carbonate consists of a cyclic carbonate; and (iii) an electrolyte salt, in which the propionate-based ester is represented by the following Chemical Formula 1:

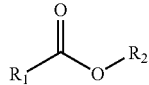

Chemical Formula 1 where $R_1$ is a $CH_3CH_2$ group and $R_2$ is a linear or branched $C_{1-5}$ alkyl group, and $R_1$ and/or $R_2$ may be unsubstituted or substituted with at least one halogen, respectively.

2. The secondary battery according to claim 1, wherein the cyclic anhydride is a compound that is reduced prior to the carbonate and the propionate-based ester when the secondary battery is initially charged, thereby forming a SEI (solid electrolyte interface) film on a surface of the anode.

3. The secondary battery according to claim 1, wherein the cyclic anhydride is selected from succinic anhydride, citraconic anhydride, itaconic anhydride, and phthalic anhydride.

4. The secondary battery according to claim 1, wherein the propionate-based ester is selected from the group consisting of methyl propionate, ethyl propionate, propyl propionate, and butyl propionate.

5. The secondary battery according to claim 1, wherein the content of the cyclic anhydride is about 0.1 to about 5 parts by weight, based on 100 parts by weight of the electrolyte.

6. The secondary battery according to claim 1, wherein the content of the propionate-based ester is about 3 to about 80 parts by weight, based on 100 parts by weight of the electrolyte.

7. The secondary battery according to claim 1, wherein the electrolyte salt is included at a concentration of about 0.8 M to about 2.0M with respect to the electrolyte solvent.

8. The secondary battery according to claim 1, wherein the binder includes a water-based binder for the anode having the specific surface area range from about 1.5 $m^2/g$ to about 4.5 $m^2/g$.

9. The secondary battery according to claim 8, wherein the water-based binder includes styrene-butadiene rubber (SBR).

10. The secondary battery according to claim 8, wherein the secondary battery is a lithium secondary battery.

11. A non-aqueous electrolyte for a secondary battery, comprising:
(i) a cyclic anhydride; (ii) an electrolyte solvent containing a propionate-based ester and a carbonate, wherein the carbonate consists of a cyclic carbonate; and (iii) an electrolyte salt,
wherein the propionate-based ester is represented by the following Chemical Formula 1:

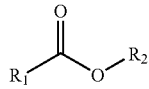

Chemical Formula 1 where $R_1$ is a $CH_3CH_2$ group and $R_2$ is a linear or branched $C_{1-5}$ alkyl group, and $R_1$ and/or $R_2$ may be unsubstituted or substituted with at least one halogen, respectively.

12. The non-aqueous electrolyte according to claim 11, wherein the cyclic anhydride is selected from succinic anhydride, citraconic anhydride, itaconic anhydride, and phthalic anhydride.

13. The non-aqueous electrolyte according to claim 11, wherein the propionate-based ester is selected from the group consisting of methyl propionate, ethyl propionate, propyl propionate, and butyl propionate.

14. The non-aqueous electrolyte according to claim 11, wherein the content of the cyclic anhydride is about 0.1 to about 5 parts by weight, based on 100 parts by weight of the electrolyte.

15. The non-aqueous electrolyte according to claim 11, wherein the content of the propionate-based ester is about 3 to about 80 parts by weight, based on 100 parts by weight of the electrolyte.

16. The non-aqueous electrolyte according to claim 11, wherein the cyclic carbonate and the proprionate-based ester are mixed in a volume ratio of about 3 to about 7.

17. The secondary battery according to claim 1, wherein the cyclic carbonate and the proprionate-based ester are mixed in a volume ratio of about 3 to about 7.

* * * * *